United States Patent
Tiryaki

(10) Patent No.: US 9,701,258 B2
(45) Date of Patent: Jul. 11, 2017

(54) VEHICLE VISION SYSTEM

(71) Applicant: MAGNA ELECTRONICS INC., Auburn Hills, MI (US)

(72) Inventor: Riza Tiryaki, Gorssostheim-Wenigumstadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 357 days.

(21) Appl. No.: 14/324,696

(22) Filed: Jul. 7, 2014

(65) Prior Publication Data

US 2015/0015710 A1    Jan. 15, 2015

Related U.S. Application Data

(60) Provisional application No. 61/844,173, filed on Jul. 9, 2013.

(51) Int. Cl.
*B60R 11/04* (2006.01)
*G06F 3/01* (2006.01)
*B60R 1/00* (2006.01)
*H04N 5/232* (2006.01)

(52) U.S. Cl.
CPC ............... *B60R 11/04* (2013.01); *B60R 1/00* (2013.01); *G06F 3/017* (2013.01); *H04N 5/23216* (2013.01); *B60R 2300/103* (2013.01); *B60R 2300/602* (2013.01); *H04N 5/23238* (2013.01)

(58) Field of Classification Search
CPC  B60R 1/00; B60R 2300/103; H04N 5/23216; H04N 5/23238; G06F 3/017

USPC .......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,788,809 B1 * | 9/2004 | Grzeszczuk ............ G06F 3/017 345/419 |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 2002/0126876 A1 * | 9/2002 | Paul ........................ G06F 3/017 382/104 |

(Continued)

*Primary Examiner* — Nguyen Truong
(74) *Attorney, Agent, or Firm* — Gardner, Linn, Burkhart & Flory, LLP

(57) ABSTRACT

A vision system of a vehicle includes a camera in the vehicle with a field of view that encompasses at least a hand of a driver of the vehicle. A control includes an image processor operable to process image data captured by the camera. The control, responsive to image data processing, is operable to determine a hand of the driver of the vehicle and, responsive to determination of movement of the driver's hand, is operable to determine if the movement is indicative of a gesture for controlling an accessory of the equipped vehicle. The control learns habitual movements of the driver's hand and, responsive to (i) determination that a detected gesture is not indicative of a learned habitual movement and (ii) determination that the detected gesture is indicative of a gesture for controlling an accessory of the equipped vehicle, the control generates an output for controlling the accessory.

20 Claims, 4 Drawing Sheets

(56) References Cited

U.S. PATENT DOCUMENTS

| | | | |
|---|---|---|---|
| 2011/0242025 A1* | 10/2011 | Wen | G06F 3/04883 |
| | | | 345/173 |
| 2012/0249791 A1* | 10/2012 | Shen | H04N 7/181 |
| | | | 348/148 |
| 2012/0327232 A1* | 12/2012 | Yang | B60N 2/0248 |
| | | | 348/148 |
| 2013/0155237 A1* | 6/2013 | Paek | G06F 1/1632 |
| | | | 348/148 |
| 2013/0250108 A1* | 9/2013 | Du | G06K 9/00221 |
| | | | 348/148 |
| 2014/0160248 A1* | 6/2014 | Pomerantz | G06F 1/163 |
| | | | 348/47 |
| 2014/0184494 A1* | 7/2014 | Burachas | G06F 3/012 |
| | | | 345/156 |
| 2014/0336876 A1 | 11/2014 | Gieseke et al. | |
| 2015/0009010 A1 | 1/2015 | Biemer | |
| 2015/0277735 A1 | 10/2015 | Gibson | |
| 2015/0296135 A1 | 10/2015 | Wacquant et al. | |
| 2015/0344028 A1 | 12/2015 | Gieseke et al. | |

* cited by examiner

VEHICLE VISION SYSTEM

CROSS REFERENCE TO RELATED APPLICATION

The present application claims the filing benefits of U.S. provisional application Ser. No. 61/844,173 filed Jul. 9, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a gesture control system that is operable to determine a user's hand (such as a driver's hand) in a cabin of the vehicle and, responsive to a determination of a movement of the user's hand, the system is operable to determine if the movement is indicative of a gesture for controlling an accessory of the vehicle. The system learns habitual movements of the user's hand (for that particular user or driver) and is operable to recognize the learned habitual movements to reduce false determinations of gestures. Responsive to determination that a detected gesture is indicative of a gesture for controlling an accessory of the vehicle and is not indicative of a learned habitual movement, the system generates an output for controlling the accessory (such as for controlling or adjusting an exterior camera's field of view or for controlling or adjusting a virtual viewing angle for a bird's eye view system or the like).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
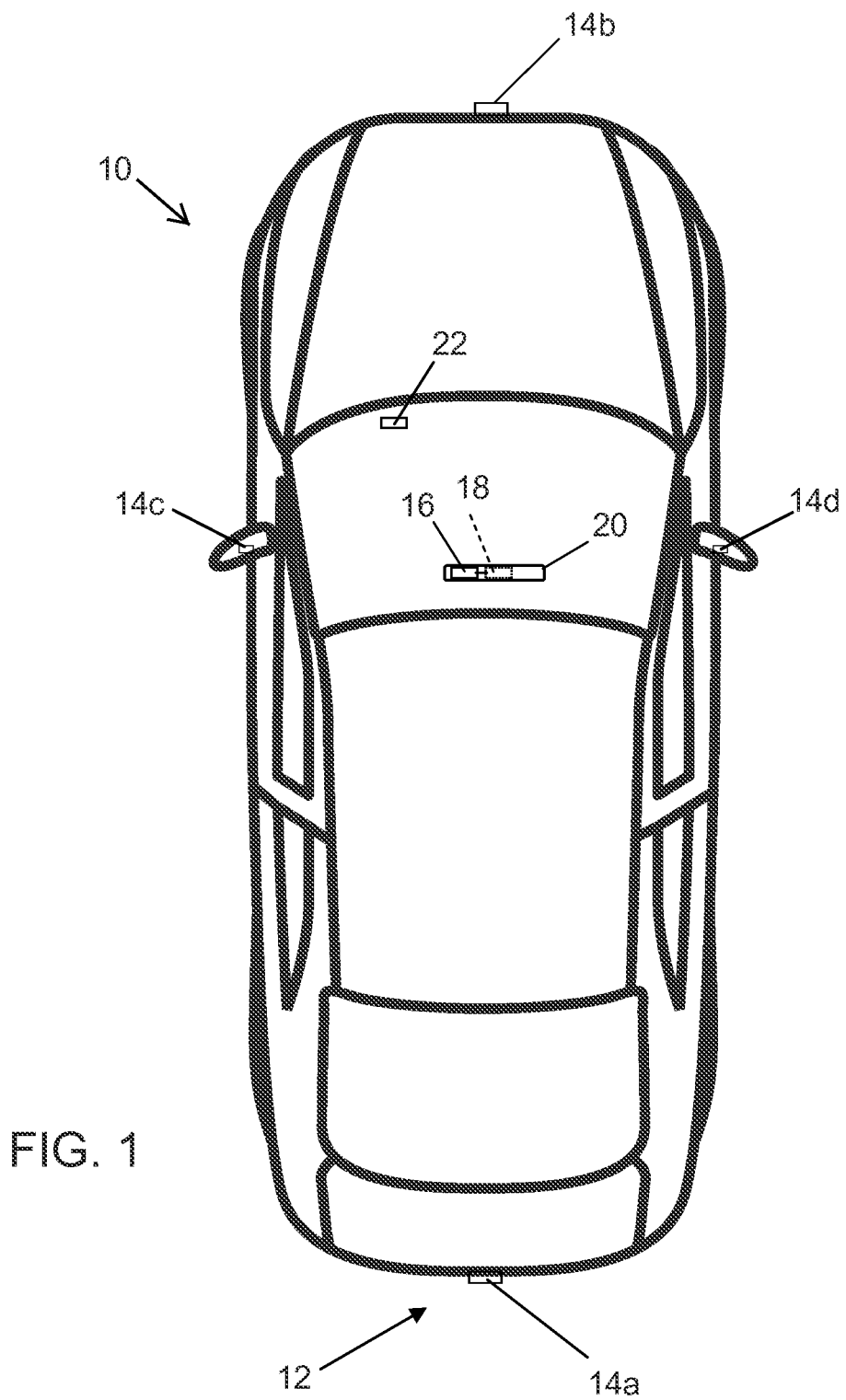
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In the illustrated embodiment, the vision system includes an interior monitoring camera 22 having an interior field of view to capture images or image data of and track or monitor the position of the driver's hands and/or head and/or the direction that the driver's eyes are looking (such as by using aspects of the vision systems described in U.S. Pat. No. 7,914,187, which is hereby incorporated herein by reference in its entirety). Responsive to image processing of image data captured by the interior monitoring camera, the system may determine gestures made by the driver and may control one or more of the cameras according to the determined gesture or movement.

Gesture recognition is known, such as described in U.S. Publication No. US2013/0155237, which is hereby incorporated herein by reference in its entirety. In such systems, learning and calibration modes for user specific gesture profile generation/improvement are specified. The user specific gesture profile generation/improvement requires active efforts of driver input, either by passing a calibration procedure or by giving redundant input by voice to confirm or disconfirm user gesture inputs recognitions or to strengthen the its confidence level. The system may also incorporate driver inputs by eye gaze such as described in U.S. provisional application Ser. No. 61/977,941, filed Apr. 10, 2014, which is hereby incorporated herein by reference in its entirety.

An automotive gesture recognition of any kind may come into use. Typically, such systems employ one or two cameras, such as one or two infrared (IR) or near IR cameras and an IR or near IR illumination source. An associated control and image processor or image processing system may process captured image data and, responsive to such image processing, discriminate a driver's (or user's) hand (and eventually arm and fingers) position. By tracking the hand and/or finger movements within the 3D room or space, gestures may become discriminatable. Typically, there are reference datasets of gestures. Currently captured hand movements may be detected as an intended gesture which may be compared to the nearest likely reference with a more or less certainty of likelihood. As the actual captured gesture becomes more different from the reference data set, a non-detection or a false detection may be more likely, resulting in poor performance of the system and driver frustration.

The present invention provides a system or control or algorithm that enhances or improve the true positive gesture recognition rate. The system of the present invention may always or most of the time observe the driver's or user's gestures (hand and body and head gestures) and behavior while the driver is operating the vehicle and when the system is activated. The system may also observe the driver's or user's reaction, response or consecutive gesture or sequence of gestures after he or she has receives a visual, audible, tactile, haptic feedback, including non-tactile haptic feedback through the air by directed steadily controlled sound waves (as a haptic feedback channel), such as described in U.S. provisional application Ser. No. 61/972,707, filed Mar. 31, 2014, which is hereby incorporated herein by reference in its entirety.

The user may be the driver or another vehicle passenger than the driver (or a virtual avatar in specific modes). The system may learn to distinguish the intended gestures from habits the specific driver may have. Habits may, for example, include situations where the driver (or user) may scratch his or her ear twice a minute, or may often reach towards the ash tray, or may snap or tap his or her fingers to the music and/or the like.

The learning system or algorithm may process the captured image data of the driver or user over time to determine repetitive actions or motions and, when the repetition reaches a threshold level, the system may determine or conclude that such actions or motions are a habitual act by the driver or user and are not an attempt by the driver or user to actuate or control an accessory of the vehicle via the gesture recognition system. The system may store the habitual actions/gestures in memory for that particular driver (such as for a particular driver as recognized utilizing aspects of the systems described in U.S. patent application Ser. No. 14/316,940, filed Jun. 27, 2014, which is hereby incorporated herein by reference in its entirety). The learning system or algorithm may utilize a Bayesian classifier or other classification model (which may utilize aspects of the vehicle image vision classification systems described in the above incorporated U.S. patent application Ser. No. 14/316, 940) or other statistically knowledge based learning system for achieving the desired learning. For classifying a habit, the rate of replication may be an input to the classification model.

The system of the present invention thus may learn the habitual movements or actions of a driver of the vehicle while the driver is sitting in the driver seat and operating the vehicle. The particular driver who is driving/operating the equipped vehicle may be known to the subject control via one or more inputs or means (so that the system may adjust its operation and use/store habitual movements for multiple distinct and known drivers that operate the vehicle). For example, the particular driver may be a driver already programmed into a memory system of the equipped vehicle, such into a memory system of the type typically known for the likes of memory seat positioning and/or memory exterior mirror positioning. Optionally, the particular driver may identify himself or herself to the control or system, such as via voice identification or key input/touch input at a suitable user input provided in the interior cabin of the equipped vehicle. Optionally, and such as described in the above incorporated U.S. patent application Ser. No. 14/316,940, the likes of facial recognition or the like may be undertaken by the system via image processing of captured image data, such as for systems where the field of view of the camera encompasses the face of the driver seated at the driver's seat of the equipped vehicle. Optionally, other biometric inputs may be used to identify the driver, such as fingerprint input, retinal identification and/or the like.

In accordance with the present invention, the control learns and stores information or data or captured image data representative of a habitual movement of a body part (for example, and preferably, a hand, whether gloved or not) of a driver of a vehicle, and does so during prior driving events when such habitual movements are distinguished by the control from intended gestures to control or activate/deactivate or otherwise impact accessories of the vehicle (such as, for example, volume control of an audio system or windshield wiper operation or camera control or the like). Thus, during a particular driving event by a particular driver, a determined movement of the hand of the driver that is consistent with or that is comparable to those historical habitual movements stored by the control for that driver can be ignored by the control.

Although illustrated with an exemplary learning of habitual hand movements, a system in accordance with the present invention may learn and recognize or determine other body part movements made by the driver of the vehicle (while operating the vehicle) to determine if those movements are habitual or are being intentionally made as a gesture or movement to control an accessory of the vehicle. For example, the system may learn habitual head movements and/or eye movements of the driver and may distinguish such habitual movements from intended gestures or movements or gaze direction to control or activate/deactivate or otherwise impact accessories of the vehicle.

Optionally, the learning process or the learned habits may be adjusted or distinguished depending on the environment that the driver or vehicle is in. In other words, the system may identify a habitual action when a particular movement occurs in one type of environment or condition, but may not consider the same or similar action a habitual action in another type of environment or condition. For example, and as an additional aspect of the present invention, the inputs to the classification model may also include the time of day, the season, the outside weather conditions, the in cabin temperature and moisture (inside weather or climate conditions), the number of occupants in the vehicle, the traffic situation (traffic jam, free, construction side and the like), the kind of road that the vehicle is traveling on (off road, parking lot, highway, city street) and/or the like. Additionally, or alternatively, the model may employ a kind of scoring level of the stress factors appealing to the driver (or user) or may receive it from another system.

The classification model may have some specific modes at which some gestures are dedicated to a different meaning or function as in "normal" mode. The modes may include, for example: on phone, listening to music on the radio, parking the vehicle, just entered the vehicle and/or the like. For example, when music is playing in the vehicle, the system may determine that particular movements may be the driver or user moving his or her hand to the music, but when music is not playing in the vehicle, the system may determine such movements as a gesture that is intended to control an accessory. As the opposite, there may be "style guides" which may standardized gestures, so that a user does not need to learn different gestures for the same function on different modes or systems. For example, a gesture for "Stop" may be identical for stopping the music playing on a MP3 player as for stopping a vehicle that is (driver supervised) autonomously maneuvering into a parking lot.

More "style guides" gestures may include:
Yes/Confirm/Start/Enter
No/Reject/Stop/Exit
Up
Down
Left
Right
Undo
Lock gestures input
Unlock gesture input The learning (especially of habits) may also happen when the intentioned gesture input is disengaged. As another aspect of the present invention, the system may acknowledge former drivers individually. It may store local or remote and resume each driver's learned data set and continue to add learning data to it each time the individual driver enters the car (resuming from remote or from local storage media) or enters a different car having this kind of system installed (resuming from remote). By that it may be possible to exclude driver specific habits as being interpreted as gesture inputs to decrease the false positive gesture acknowledge rate.

An end of line data set may be an initial standard data set of pre-learned average person's behavior. Additionally, the system may learn to increase its true positive rate by steadily increasing the data set by learning. The system may learn that a positive was a false positive (to correct its dataset itself afterwards) in cases where the driver (or user) instantly reverses the input which was given immediately before. The system may assume a positive was true in cases where no reversing is executed immediately following the action or gesture. There may be a decision time window, such as, for example, about five seconds, after a gesture input, where if a reversing action is undertaken within the time window, the system may assume that the gesture was a false positive.

Additionally, there may be a known system interface to the driver (or user) to report wrong positive gesture inputs which may make the learning more efficient, but may require the driver (or user) to care and to take the time to report the wrong positive gesture inputs. Additionally, the system may offer the possibility and maybe an interface to initiate the learning of an individual gesture that the driver (or user) desires for an already associated control function or a new function which wasn't dedicated to a gesture (-control) before. Also, the driver may have the possibility to alter the associated function of an already known gesture which may already possess some learned data. Additionally, the system may be combined with other control interface, such as voice control or the like. There may be a redundancy of gestures controls and other controls which will give the driver (or user) the choice to pick the interface he or she likes more in specific situations.

The system may be combined with a virtual vision system such as described in U.S. patent application Ser. No. 14/272,834, filed May 8, 2014, which is hereby incorporated herein by reference in its entirety. In there the use of pairs of or mono glasses, which actively display virtual overlays in to the user's view at or in the glass/glasses is suggested to replace head up displays. In accordance with the present invention, the virtual reality display may be comprised by active glasses (as like Google glass) or head up displays or for certain extend by display monitors arranged in the vehicle.

Virtual and non-virtual gesture functions realized by the system of the present invention may, for example, include:
Virtually drag and drop own vehicle into parking gap or space;
Virtually place a ruler between a first and a second object;
The turning, moving and zooming of a virtual camera of a vehicle top view vision system; and/or
The turning, moving and zooming of a real camera of a vehicle vision system.

The virtual or real turning moving and zooming control of a camera may be done by one hand only. It may be achieved without discriminating all of the fingers of the hand, but just the thumb discriminated from the other four fingers (as one feature unit) and the hand wrist. For gestures for driver controls, the gesturing hand may be the left hand on a vehicle with the steering wheel on the right hand side and the gesturing hand may be the right hand on a vehicle with the steering wheel on the left hand side.

As an example for supporting the control of a virtual view (or control of an accessory of the vehicle or the like) by gesture, there may be the control of a virtual vehicle surround view camera system and/or other suitable gesture recognition control. For controlling a virtual, or alternatively, real camera (view or function) by gesture, the driver (or user) may hold his or her hand into the air (may be in about breast height as a convenient height) such as like resting the hand on a virtual ball or bowl (virtual reality systems may or may not show this bowl additionally).

Figure 2:
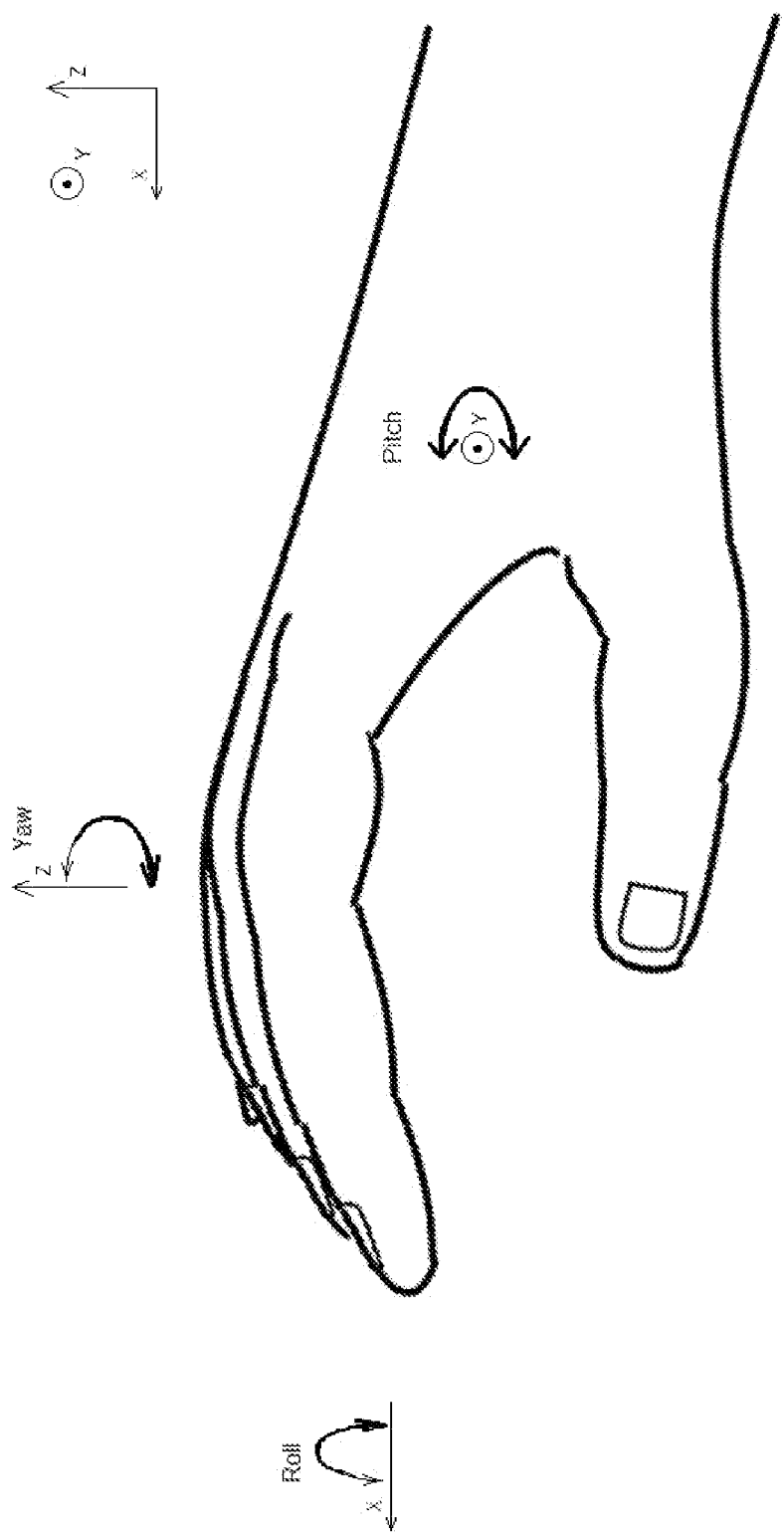
FIG. 2 is a perspective views of a person's hand and the coordinate system used by a vision system or gesture recognition system of the present invention.
Figure 3:
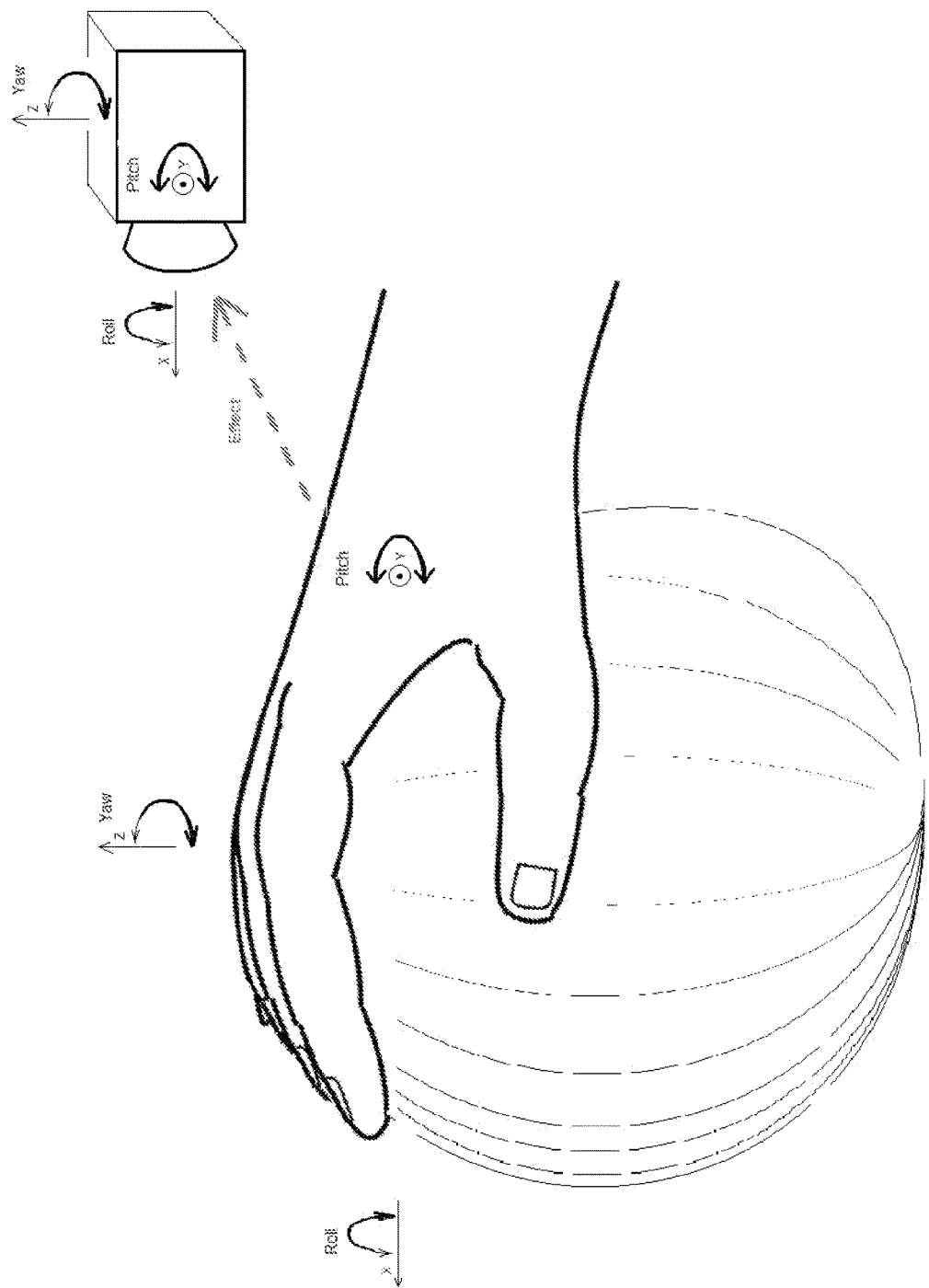
FIG. 3 is another perspective view of a person's hand, showing the hand as virtually placed at a virtual ball or sphere or bowl.
Figure 4:
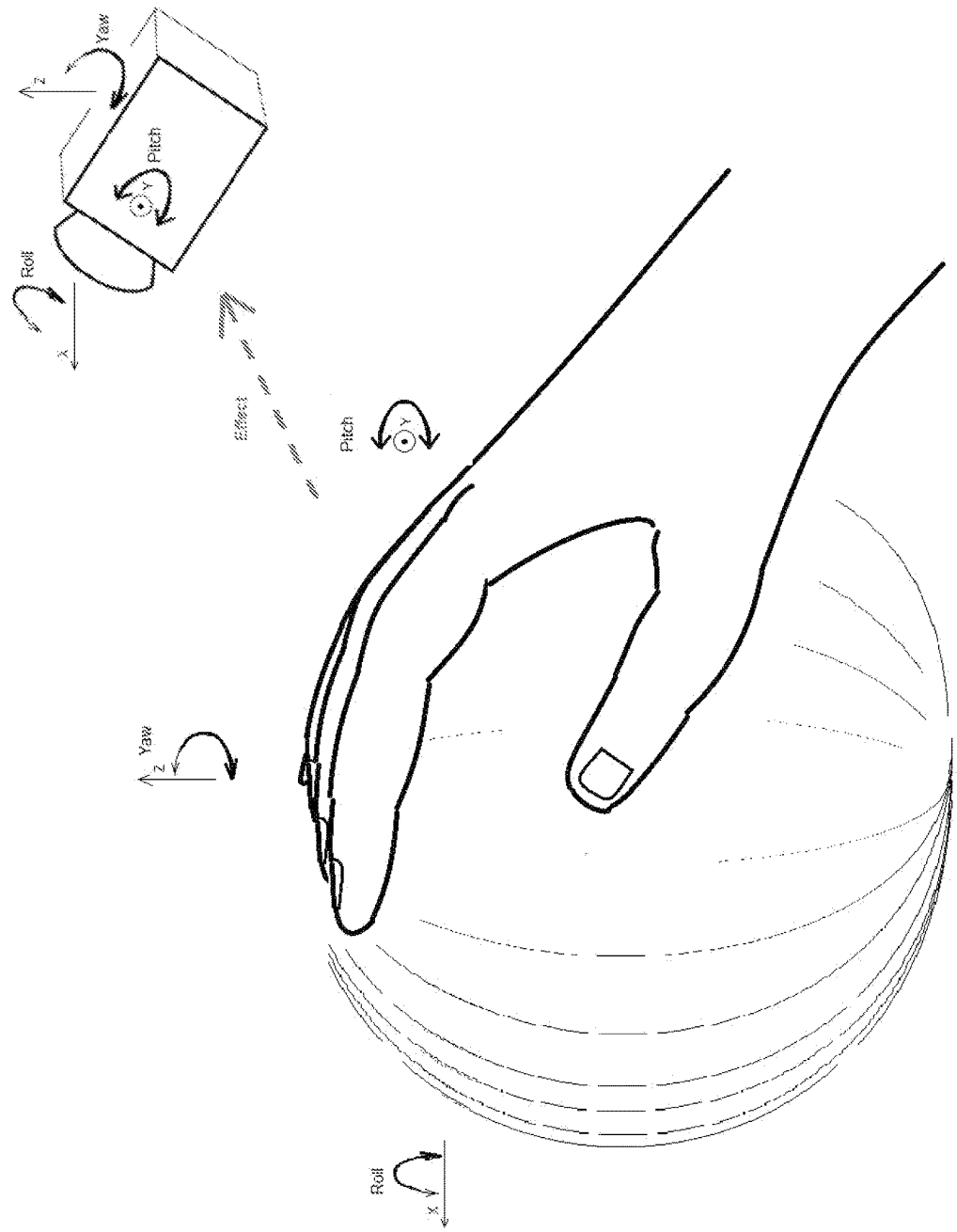
FIG. 4 is another perspective view of a person's hand, showing movement of the hand.

An example of this is shown in FIGS. 2 and 3. Responsive to a detection of (thought) gliding sideward with the hand on the (virtual) top surface of the (virtual) ball or bowl, the virtual camera view (of a top down or bird's eye view or surround view vision system having a top down display from a single virtual camera viewpoint) may roll or adjust in an according angle and direction, or a real camera (such as a selected one of the multiple cameras of a top down or bird's eye view or surround view vision system of the vehicle) may roll or adjust as actuated by actuators. Pitching the hand (gliding forward and backward on the (virtual) bowl surface) may control an according pitching of the virtual camera view or the real camera or virtual camera view (such as can be seen with reference to FIG. 4). At the time the hand does a yaw turning, the real camera or virtual camera view may change yaw. By raising and lowering the hand, the virtual view point may go up and down, by moving the hand sideward, the virtual camera may traverse by keeping its looking angle. In practice, there may be no actuators to also raise, lower and traverse a real camera, so this function may only be available on virtual camera views.

Additionally, or alternatively, as eventually more intuitive control is provided, the driver (or user) may have the ability to grab a virtually projected vehicle (preferably projected within his or her area of reach) and turn it virtually (with his or her real world or partially or fully augmented hand). By doing that, the system, responsive to such hand gesture or movement, may change the driver's viewing direction to the vehicle accordingly. This may be more intuitive as virtual camera control as controlling the camera position.

An application for this function may be a parking lot selection function (which may utilize aspects of or be a part of the automated parking systems described in U.S. provisional application Ser. No. 62/006,391, filed Jun. 2, 2014, which is hereby incorporated herein by reference in its entirety) when the driver is about to direct his or her vehicle's parking assistant system to one of maybe several possible parking spots. The driver may have the ability or option to choose whether his or her vehicle will park backwardly or forwardly into a parking spot (whatever his/her reasons may be, such as, for example, for easing the unloading the vehicle trunk). Optionally, there may be snap like fitting of the virtual car, where the driver may drag and drop the virtual vehicle into an available parking spot at the first try. The snap may be disabled when the driver may grab the virtual vehicle virtually a second time to give him/her the possibility for fine adjustments or maybe diagonal parking or to overcome wrongly acknowledged parking spots.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/297,663, filed Jun. 6, 2014; Ser. No. 14/362,636, filed Jun. 4, 2014; Ser. No. 14/290,028, filed May 29, 2014; Ser. No. 14/290,026, filed May 29, 2014; Ser. No. 14/359,341, filed May 20, 2014; Ser. No. 14/359,340, filed May 20, 2014; Ser. No. 14/282,029, filed May 20, 2014; Ser. No. 14/282,028, filed May 20, 2014; Ser. No. 14/358,232, filed May 15, 2014; Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248, 602, filed Apr. 9, 2014; Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169, 328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082, 573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016, 790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser.

No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 62/007,542, filed Jun. 4, 2014; Ser. No. 62/006,391, filed Jun. 2, 2014; Ser. No. 62/003,734, filed May 28, 2014; Ser. No. 62/001,796, filed May 22, 2014; Ser. No. 62/001,796, filed May 22, 2014; Ser. No. 61/993,736, filed May 15, 2014; Ser. No. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. No. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; and/or Ser. No. 61/836,380, filed Jun. 18, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

a camera disposed in an interior cabin of a vehicle equipped with said vision system, said camera having a field of view that encompasses at least a hand of a driver of the equipped vehicle;

a control comprising an image processor operable to process image data captured by said camera;

wherein said control, responsive to image processing of captured image data by said image processor, is operable to determine a movement of a hand of the driver of the equipped vehicle;

wherein, responsive to determination of movement of the driver's hand, said control is operable to determine if the movement is indicative of a gesture for controlling an accessory of the equipped vehicle;

wherein said control learns habitual movements of the driver's hand and is operable to distinguish intended gestures from learned habitual movements; and wherein, responsive to (i) determination that a detected gesture is not indicative of a learned habitual movement and (ii) determination that the detected gesture is indicative of an intended gesture for controlling an accessory of the equipped vehicle, said control generates an output for controlling the accessory.

2. The vision system of claim 1, wherein said control is operable to recognize the learned habitual movements of the driver to reduce false determinations of gestures.

3. The vision system of claim 1, wherein said control learns habitual movements of multiple drivers and wherein said control, responsive to identification of the particular driver operating the equipped vehicle, is operable to determine whether a detected gesture of the particular driver is indicative of a learned habitual movement of that particular driver.

4. The vision system of claim 3, wherein identification of the particular driver is made via one of (i) a user input and (ii) image processing of captured image data by said image processor.

5. The vision system of claim 1, wherein the accessory comprises a plurality of cameras disposed at the equipped vehicle and having respective fields of view exterior of the equipped vehicle.

6. The vision system of claim 5, wherein said vision system controls at least one of (a) a viewing angle of individual cameras and (b) a viewing angle of a virtual camera.

7. The vision system of claim 1, comprising a display screen disposed in the interior cabin of the equipped vehicle and viewable by the driver of the equipped vehicle.

8. The vision system of claim 7, wherein said display screen is operable to display at least one virtual user input and wherein said control is operable to determine actuation of the virtual user input responsive to movement of the driver's hands relative to a virtual location and type of user input of the displayed virtual user input.

9. The vision system of claim 1, wherein said control learns habitual movements of the driver's hand responsive to image processing of multiple frames of captured image data by said image processor.

10. The vision system of claim 1, wherein said control, after learning habitual movements of the driver's hand, is operable to discern an intentional gesture by the driver to control an accessory from a habitual movement of the driver's hand.

11. The vision system of claim 1, wherein the learned habitual movement comprises at least one of (i) a repeating scratching movement, (ii) a repeating reach towards a region in the vehicle, (iii) a repeating movement corresponding to music playing in the vehicle.

12. A vision system of a vehicle, said vision system comprising:
a camera disposed in an interior cabin of a vehicle equipped with said vision system, said camera having a field of view that encompasses at least a hand of a driver of the equipped vehicle;
a control comprising an image processor operable to process image data captured by said camera;
wherein said control, responsive to image processing of captured image data by said image processor, is operable to determine a movement of a hand of the driver of the equipped vehicle;
wherein, responsive to determination of movement of the driver's hand, said control is operable to determine if the movement is indicative of a gesture for controlling an accessory of the equipped vehicle;
wherein said control learns habitual movements of the driver's hand for multiple drivers and stores habitual movement data for the multiple drivers, and wherein said control is operable to distinguish intended gestures of a driver from learned habitual movements of that driver;
wherein said control learns habitual movements of the driver's hand responsive to image processing of multiple frames of captured image data by said image processor; and
wherein, responsive to (i) identification of the particular driver operating the equipped vehicle, (ii) determination that a detected gesture is not indicative of a learned habitual movement of that particular driver and (iii) determination that the detected gesture is indicative of an intended gesture for controlling an accessory of the equipped vehicle, said control generates an output for controlling the accessory.

13. The vision system of claim 12, wherein identification of the particular driver is made via one of (i) a user input and (ii) image processing of captured image data by said image processor.

14. The vision system of claim 12, wherein the accessory comprises a plurality of cameras disposed at the equipped vehicle and having respective fields of view exterior of the equipped vehicle, and wherein said vision system controls at least one of (a) a viewing angle of individual cameras and (b) a viewing angle of a virtual camera.

15. The vision system of claim 12, comprising a display screen disposed in the interior cabin of the equipped vehicle and viewable by the driver of the equipped vehicle, wherein said display screen is operable to display at least one virtual user input and wherein said control is operable to determine actuation of the virtual user input responsive to movement of the driver's hands relative to a virtual location and type of user input of the displayed virtual user input.

16. The vision system of claim 12, wherein the learned habitual movement comprises at least one of (i) a repeating scratching movement, (ii) a repeating reach towards a region in the vehicle, (iii) a repeating movement corresponding to music playing in the vehicle.

17. A vision system of a vehicle, said vision system comprising:
a camera disposed in an interior cabin of a vehicle equipped with said vision system, said camera having a field of view that encompasses at least a hand of a driver of the equipped vehicle;
a control comprising an image processor operable to process image data captured by said camera;
wherein said control, responsive to image processing of captured image data by said image processor, is operable to determine a movement of a hand of the driver of the equipped vehicle;
wherein, responsive to determination of movement of the driver's hand, said control is operable to determine if the movement is indicative of a gesture for controlling an accessory of the equipped vehicle;
wherein said control learns habitual movements of the driver's hand and is operable to distinguish intended gestures from learned habitual movements;

wherein said control learns habitual movements of the driver's hand responsive to image processing of multiple frames of captured image data by said image processor;

wherein said control, after learning habitual movements of the driver's hand, is operable to discern an intended gesture by the driver to control an accessory from a habitual movement of the driver's hand; and wherein, responsive to (i) determination that a detected gesture is not indicative of a learned habitual movement and (ii) determination that the detected gesture is indicative of an intended gesture for controlling an accessory of the equipped vehicle, said control generates an output for controlling the accessory.

18. The vision system of claim 17, wherein said control learns habitual movements of multiple drivers and wherein said control, responsive to identification of the particular driver operating the equipped vehicle, is operable to determine whether a detected gesture of the particular driver is indicative of a learned habitual movement of that particular driver, and wherein identification of the particular driver is made via one of (i) a user input and (ii) image processing of captured image data by said image processor.

19. The vision system of claim 17, comprising a display screen disposed in the interior cabin of the equipped vehicle and viewable by the driver of the equipped vehicle, and wherein said display screen is operable to display at least one virtual user input and wherein said control is operable to determine actuation of the virtual user input responsive to movement of the driver's hands relative to a virtual location and type of user input of the displayed virtual user input.

20. The vision system of claim 17, wherein the learned habitual movement comprises at least one of (i) a repeating scratching movement, (ii) a repeating reach towards a region in the vehicle, (iii) a repeating movement corresponding to music playing in the vehicle.

* * * * *